3,271,160
PROCESS FOR PREPARING FEED FROM UNDE-CORTICATED OIL FREE SAFFLOWER SEED RESIDUE
George A. Kopas, San Francisco, and John A. Kneeland, Menlo Park, Calif., assignors to Pacific Vegetable Oil Corporation, San Francisco, Calif., a corporation of California
Filed May 27, 1963, Ser. No. 283,400
9 Claims. (Cl. 99—2)

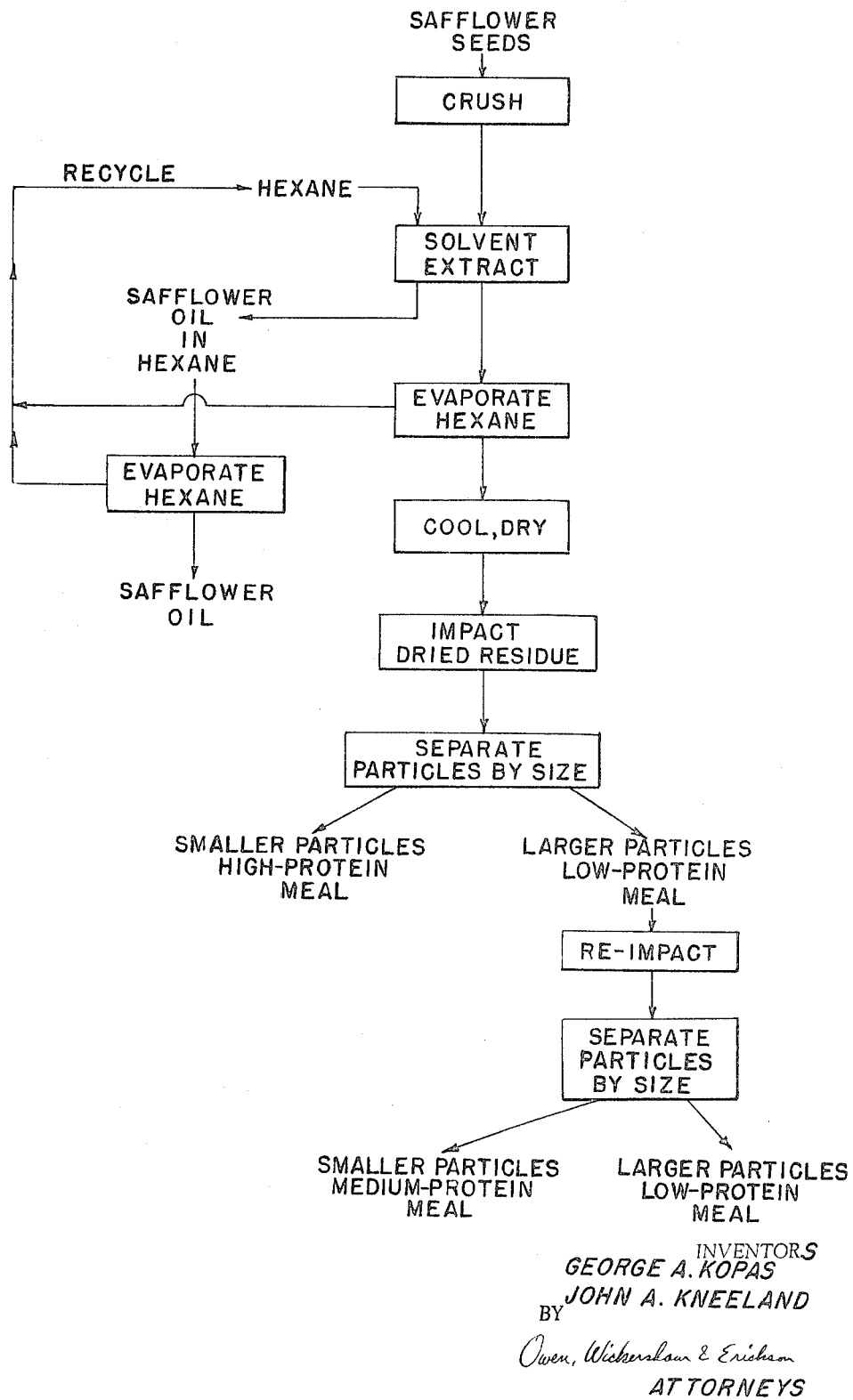

This invention relates to the processing of safflower seeds, with particular reference to the processing of the residue remaining after removal of the safflower oil. More particularly, it relates to the production from this residue of at least three oil-free fractions: (1) a high-protein meal suitable for human food and for poultry and swine feeds, (2) a medium-protein meal suitable for cattle roughage feed, and (3) a low-protein fiber chaff suitable for use as an adhesive extender and as an inert filler.

Safflower seeds are grown primarily in order to extract from them their oil content of about 36%, for safflower oil is a valuable commodity with many desirable properties. After the oil is taken out, the residue, about 64% of the seed, is an intimate mixture of fractured hull particles and what is left of the meats. The hulls are very low in protein and are quite fibrous. The meat residue is very high in protein, being up to about 56% protein, and is an excellent feed material. Both materials are useful in themselves and so is the mixture, but the mixture is a relatively low-grade feed of about 16% to 30% (typically 18–24%) protein content that brings only moderate prices and can be sold only in limited amounts. Much higher prices can be obtained for a low-fiber high-protein meal that is at least forty-percent protein, and a good price can also be obtained for a meal of about twenty to thirty percent protein if there is not too much of it. Low-protein oil-free hull chaff makes a better adhesive extender in proportion as it is free from meat residue.

The problem is that it has been quite difficult and uneconomical to achieve sufficient discrimination between the hulls and the meats to give economic quantities of the high-protein meal. Even hand-picking cannot obtain good separation because the protein is stuck to the hull. Classification by specific gravity does not help much for the same reason. Classification by size gives some separation (because of some high-protein dust) but not much, as shown by a typical screen pattern for this untreated residue, the overall sample having a 21% protein content:

TABLE I

*Screen fractions of a typical oil-free safflower seed residue*

| Mesh | Weight Percent of retained fraction | Protein Percent of retained fraction |
| --- | --- | --- |
| 4 | 4.1 | 21.1 |
| 8 | 14.2 | 17.9 |
| 10 | 16.8 | 15.0 |
| 16 | 30.8 | 16.1 |
| 24 | 14.5 | 21.6 |
| 35 | 11.7 | 30.8 |
| 60 | 5.2 | 41.4 |
| Pan | 2.7 | 44.7 |

Only the 7.9% that passed through a 35 mesh screen had a protein content above 40%. That left 92.1% of the residue, at an average protein content of 19.1%. Even considering the 11.7% that passed through a 24 mesh screen but was retained by the 35 mesh screen—for its 30.8% protein content is a good high-class middling fraction—still more than 80% of the residue would be left with a protein content of only 17.4%, so that its price would be quite low, in accordance with its low value, especially in view of the quantity produced. Moreover, note that the lowest-protein fraction had 15% protein, a value undesirably high for use as an adhesive extender; also this fraction was *not* the largest size fraction but was an intermediate fraction. Certainly it is uneconomical to divide the residue into eight fractions, as was done here, and it is hardly worth while screening at all if more than 80% remains at low value. Clearly, little separation of this 80% was obtained; there is practically no difference in the fractions below that which passes through a 24-mesh screen.

What is desired is a much higher amount of 40% protein, a medium amount of 20% to 30% protein, and a much better separation of the hull particles from these higher-protein fractions.

The possibility of decorticating the seeds before removing the oil has been considered. Sometimes it is desirable, and it has its advantages. However, it has had disadvantages too, and one-hundred-percent hull removal is not ordinarily achievable; in fact there is usually a high hull content in the "decorticated" meal, so that the separation problem remains after extraction of the oil from "decorticated" meal. Moreover, at the present time the oil producers usually prefer not to decorticate the seed, at least not if it means removal of most of the hulls, and therefore the problem remains as to how to obtain from the residue more valuable meal fractions than have been obtainable heretofore.

Accordingly, one object of this invention is to upgrade the value of the residue of safflower seed from which the oil has been taken out.

Another object is to upgrade the protein content of significant amounts of the residue.

Another object is to obtain from the residue economic quantities of an oil-free high protein fraction having at least 40% protein, while leaving a reduced amount of an oil-free high-quality middling fraction in the 20% to 30% protein range, and also providing a low-protein chaff fraction (preferably below 12% protein) of high fiber content.

Other objects of the invention are to provide a means of improving the discrimination between the broken safflower hulls and the broken safflower meats, to improve the by-product uses of the residue and to provide economical quantities of three or more fractions.

A further object of the invention is to provide consistent and accurate protein control of each fraction, so that the meal products can be sold at guaranteed fixed protein levels. The yields are a function of the protein content of the seed and of the protein levels made desirable by the market for the various fractions, and control is obtained by the method of the present invention. Thus, for example, the invention can produce a high protein fraction of 42%±2% protein, a middlings fraction of 21%±2% protein, and a low-protein fraction of 8%±2% protein. With higher-protein seeds, even better results can be obtained.

Other objects and advantages of the invention will become apparent from the following description.

The drawing is a flow sheet showing diagrammatically a typical process embodying the principles of the invention.

After being harvested, the safflower seeds are taken to an oil production plant. There, as shown in the flow sheet, the seeds are crushed or otherwise broken open in order to get access to the oil inside them, the seeds preferably being crushed or expressed. Then the seeds are solvent extracted, preferably with hexane, though other hydrocarbons or suitable oil solvents may be used. The seeds may be broken open by partial decortication, and there may be some partial removal of the hulls before removal of the oil, but a large proportion of the hull fiber in the material to be solvent-extracted is considered desirable: partly because about four or five percent of the oil tends to stick to the hulls, from which separate recovery is rarely economical; such oil if simply wasted, lowers the value of the safflower hulls for use as adhesive extenders. The presence of the hull fibers is an aid in the process of expelling the oil and also helps to make a cake suitable for solvent extraction. The hull fibers give the expeller something to build up pressure with, and when mechanical expelling is not used, the hulls provide porosity for good percolation and drainage as required by direct solvent extraction.

After the oil has been solvent-extracted, the solvent is recovered from both the oil and the residue. For example, hexane may be evaporated from the oil and recycled, the safflower oil being a finished product which may be further refined if necessary. The solvent (e.g., hexane) may be removed from the residue by direct or indirect steam stripping or by superheated solvent stripping. If the remaining, substantially oil-free, intimate mixture of meat and hull particles is too hot and moist (as it often is), it is then cooled and dried to a desired moisture content. For example, it may be cooled by dry air, to bring its temperature to below 200° F., or, better, below 130° F., while being dried to a moisture content below 15%. This is the "residue" with which this invention deals. Simple screening at this stage will accomplish very slight discrimination between the high and low protein materials, as has already been indicated.

Our invention includes the important discovery that if this relatively dry residue is subjected to impact—either pneumatically by shooting it in an air stream through an air gun at a target, or mechanically, as in a vertical or horizontal impact mill (a hammer mill, entoliter, or attrition mill) or in a flour mill or similar device in which impact is the major element of force—this impact will both (1) afford a detachment of most of the meat from the hulls and (2) will fracture the meats into smaller particles than is breaks the fibrous hulls. In other words, the meats are broken up more than are the hulls and the fractured meat particles are detached from the hulls.

An important result of this discovery is that—so long as the impacting effects this detachment of meat particles from hull particles and so long as comminution of the meats is relatively great and comminution of the hull particles relatively small—a classification by size alone can be used to divide the residue into three or more fractions of markedly different protein content. This makes classification into fractions of different protein content economical and practical instead of theoretical and impractical. It is important for controlled impact to be the major element of the process, so that there is a *breaking* action due to impact but not a *cutting* action, for cutting would divide the hull particles as much as the meat particles. Similarly, over-impacting eventually breaks up the hull particles into small sizes that cannot be classified from the meat particles by sizing.

Furthermore, we have found that when the larger, low-protein fraction obtained from the classification of the once-impacted residue is re-impacted and again separated by size, a medium-to-high protein content meal fraction is obtained along with a lower-protein hull fraction. This enables a considerable saving and enables the process to be carried out quite economically, practically, and consistently. Apparently, the impacting in each case loosens, the hulls from the meat so that they do not go along together and also, although effecting some breakage of hulls, which are more fibrous and more impact-resistant than the meats, breaks the hulls far less than it breaks the meats. When thereby controlled, re-impacting enables further separation into medium and low protein fractions, the economy and practicality of the operation is further enhanced. More impacting steps and attendant further classification can be added, but care is taken not to over-impact the residue to the stage where the hulls are broken into small particles that cannot be separated from the meat particles by any practical sizing process.

The following examples will give some illustrations of what happens. It should be borne in mind that the meats are about 56% protein, and the hulls are generally about 3% to 4% protein. If the meats of some safflower seeds are large relative to the hulls, the overall protein content of the seeds is raised, but it will only approach closer to the 56% limit, not exceed it, and the hull fraction could not be dropped below a limit of about 4% protein content even if there were perfect separation between the hulls and the meats.

EXAMPLE 1

Dried residue of 21.6% protein content from pre-pressed and solvent-extracted safflower seeds was broken up by impact in a modified vertical hammer mill. An air stream removed (1) a stream of fine particles 17% by weight of the residue and of 45.8% protein content, broken off the hulls and carried there through a 3/64"-perforation screen. The coarse fraction, discharged through an opening in the bottom of the mill, was (2) a stream, 83% by weight of the residue and of 16.7% protein content. Notice that, in comparison with Table I, the protein content of stream (1) was higher than the pan fraction from the un-impacted residue and that there was almost seven times as much of it. In fact, stream (1) is almost as great as the total of what passed through the 24-mesh screen in Table I and of a much higher protein value.

The second stream (2) was then subjected to a second mechanical force in an attrition mill, which broke away more protein from the hulls and also broke the meat residue more than it broke the hulls, for the ground secondary stream was separated on a shaking screen into (3) a stream, 32% by weight of the residue, of 30% protein content and (4) a stream, 51% by weight of the residue, of the larger, coarse hull particles, having a protein content of only 8.2%. Thus, considering the total effect of the two impacts, 49% of the meal was recovered in two very valuable fractions—17% in a very-high protein prime-value product and 32% of a high-class middling fraction of far more value than the unclassified residue. Also, the 51% hull fraction had a protein content far lower than what could be obtained from the screening in Table I, and much more useful as an adhesive extender or filler than the original product. The economic value of the process was thus considerable.

EXAMPLE 2

Another device to break apart the proteinaceous material of the residue from the fibrous material of the residue is the blow gun described in Patent No. 3,080,905. By using a 40% flow rate with one pass through a 24" long barrel, the residue, much like that of Example 1, but of slightly less than 20% protein content, was directed at a target 8" from the end of the barrel. The force of the meal striking the target broke the meats much more than it broke the hulls and helped to unstick the meats from the hulls.

Instead of screening out the fractions, the meal was recycled to the blow gun four times, that is, made to hit the target four successive times before attempting any separation. Then it was screened with the following typical results:

TABLE II

*Screen fractions of quadruple-impacted oil-free safflower seed residue*

| Retained by Mesh | Weight Percent of fraction | Protein Percent of fraction |
|---|---|---|
| 20 | 20.0 | 4.2 |
| 35 | 35.9 | 6.1 |
| 60 | 12.0 | 20.4 |
| Pan | 32.1 | 44.1 |

Using only the 35-mesh and 60-mesh screens the three fractions were (1) 32.1% of 44.1% protein, (2) 12.0% of 20.4% protein, and (3) 55.9% of 5.5% protein.

Although this multiple impacting improved the separation of protein from the hull, it reduced the particle size so much that both of fractions (1) and (2) had to be pelleted. This is an economic disadvantage, but in many forms of this invention, pelleting is unnecessary.

EXAMPLE 3

As pointed out earlier, the invention calls for impacting controlled so that it does not break up the hulls to an extent that prevents separation from the meats. This example illustrates considerable improvement over the un-impacted residue, although it shows some over-impacting.

Here, an unprocessed meal, having a protein content slightly over 19%, was ground (impacted) in a high-speed hammer mill and then screened as follows:

TABLE III

*Screen fractions of slightly over-impacted oil-free safflower meal residue*

| Retained by Mesh | Weight Percent of fraction | Protein Percent of fraction |
|---|---|---|
| 20 | 23 | 5.2 |
| 35 | 36 | 9.4 |
| 60 | 14 | 22.9 |
| 80 | 7 | 34.6 |
| Pan | 20 | 44.5 |

The material retained by each of the sixty-mesh and eighty-mesh screens contained finely ground hull fibers, so that the protein was diluted. Moreover, the high protein material was very fine, making pelleting advisable at additional processing cost. Three fractions can be obtained by combining the first two and last two fractions, to give 59% of 7.8% protein, 14% of 22.9% protein and 27% of 41.9% protein, which are good results.

EXAMPLE 4

In this example, the impact was obtained from corrugated flour rolls turning at different speeds, thus imparting a breaking, tearing, and impact action to the material flowing between them.

Solvent extracted safflower residue of 19.6% protein was put through a set of flour rolls which broke off the fine particles of protein from the hulls. A set of vibrating 16-mesh and 35-mesh screens gave three fractions: (1) 38% by weight of the residue failed to pass through the 16-mesh screen; this fraction was 10.2% protein, (2) 41% by weight of the residue was middlings of 17.4% protein, and (3) 21% by weight of the residue, 40.8% protein, was fines or material that passed through the 35-mesh screen. Notice here that the 40% protein fraction was large enough so that repelleting was unnecessary, and that only 38% of low protein material remained.

EXAMPLE 5

A residue from solvent extraction of safflower seeds of about 19% protein was broken up by means of a modified hammer mill and then fractionated by means of a vibrating sets of screens. 59% by weight of the processed meal stayed on top of a 35-mesh screen and had a 7.8% protein content. A small middling fraction 14% by weight, stayed on top of the 60-mesh screen and had a 22.9% protein content. The fraction through a 60-mesh screen represented 27% by weight of the stream and had a 41% protein content.

EXAMPLE 6

A two-stage impact system was used in which the first step was a grinder and the second step was an attrition mill. The separation equipment in this case was vibrating screens. Residue from solvent extraction of safflower seeds, 22.6% protein content, was passed through the grinder and screened through a 35-mesh vibrating screen. 25% of the stream of residue was pulled off as a 42% protein meal. The coarse fraction had 17% protein. This second fraction was broken up again by means of the attrition mill and again separated by means of a vibrating screen of 28 mesh. The material passing through the screen represented 28% of the original residue and had a 32.5% protein content. The coarse fraction was 47% of the original residue and had a 6.4% protein content.

These results may be considered excellent, since there is a large fraction of high (40%) protein in particles large enough for use without pelleting. Also there is a large fraction of high-class middlings, and the protein content of the hulls fraction is low.

EXAMPLE 7

Another type of equipment which was successfully used on the solvent-extracted safflower meal residue to separate the fibrous material from the proteinaceous material was a horizontal agitated cylinder formed by screens of various sizes. A rod along the axis of the cylinder was rotated about 40–45 r.p.m. and had beater arms which beat the material passing through the horizontal cylinder, giving several impacts, but all in one cycle. The equipment was 24" in diameter, was five feet long, and could be fitted with two or three sizes of screens for separation purposes.

A solvent-extracted safflower residue of approximately 22.2% protein was fed into the agitated cylinder which had a $\frac{1}{32}$" round-hole punched plate in the first section, and a $\frac{1}{16}$" round-hole punched plate in the second section. The end of the rotating cylinder was left open for the coarsest material to flow out after the fines had been beaten off the fibrous material and screened out. The fines, 42% protein, from the first section represented 32% of the feed, and the middlings (20% protein) from the second section was 30% of the feed, and the coarse overflow or hull chaff (7% protein) was 38% of the input. These results may be considered excellent.

EXAMPLE 8

Safflower oil-free residue of 23.7% protein content was impacted in a vertical hammer mill of 50 H.P., 1800 r.p.m., 18" diameter at a ten-ton-per-hour feed. The mill had a ¼" screen and an open bottom. A first stage of separation was provided by a sifter having a 38-mesh screen with 0.0198" wide openings between 0.0065" diameter wires, and 27.2% by weight of the residue was removed as 43.2% protein content material. The remainder was re-impacted in a vertical hammer mill having a ⅛" screen and a closed bottom, and the second stage of separation was done by a 16-mesh screen having openings 0.0045" across between 0.018" wires, to obtain a 21.3% protein fraction comprising 44% by weight of the residue. The third fraction was 28.8% by weight of the residue and had a protein content of 8.9%.

EXAMPLE 9

The process of Example 8 was applied to some safflower residue having a protein content of 25.6%, to produce three fractions, (1) 33.5% by weight of 43.3% protein content, (2) 34.7% by weight of 23.7% protein content, and (3) 31.8% by weight of 9.1% protein content.

EXAMPLE 10

The process of Example 8 was applied to some safflower residue having an average protein content of 23.2% to obtain three fractions, (1) 25.4% by weight of 42.6% protein, (2) 52.7% by weight of 20.3% protein, and (3) 21.9% by weight of 7.7% protein.

TABULATION OF RESULTS

Although there may be more than three fractions, the following table, for the sake of simplicity, combines each of the ten examples into one or more three-fraction grouping. It shows the marked improvement obtained by the controlled impacting of this invention followed by size classification.

TABLE IV

*Summary of Examples 1–10*

| Example No. | High Protein Fraction | | Middlings Fraction | | Low Protein Fraction | | Average Percent Protein |
|---|---|---|---|---|---|---|---|
| | Percent Protein | Percent by Weight | Percent Protein | Percent by Weight | Percent Protein | Percent by Weight | |
| 1 | 45.8 | 17 | 30 | 32 | 8.2 | 51 | 21.6 |
| 2 | 44 | 32.1 | 20.4 | 12.0 | 5.5 | 55.9 | 20 |
| 3(a) | 44.5 | 20 | 23 | 21 | 7.8 | 59 | 19 |
| 3(b) | 42 | 27 | 22.9 | 14 | 7.8 | 59 | 19 |
| 4 | 40.8 | 21 | 17.4 | 41 | 10.2 | 38 | 19.6 |
| 5 | 41 | 27 | 22.9 | 14 | 7.8 | 59 | 19 |
| 6 | 42 | 25 | 32.5 | 28 | 6.4 | 47 | 22.6 |
| 7 | 42 | 32 | 20 | 30 | 7 | 38 | 22.2 |
| 8 | 43 | 27.2 | 21.3 | 44.0 | 8.9 | 28.8 | 23.7 |
| 9 | 43.3 | 33.5 | 23.7 | 34.7 | 9.1 | 31.8 | 25.6 |
| 10 | 42.6 | 25.4 | 20.3 | 52.7 | 7.7 | 21.9 | 23.2 |

In all these examples there is 17% to 33.5% of high protein fraction—and in all instances more than 20% of 40% protein is obtainable either directly or by blending. There is a range of 12% to 52.7% of middlings, and a range of 21.9% to 59% of a low protein fraction never higher than 10.2% protein content.

With a residue meal having 30% protein content, a sizable fraction of 50% protein meal can be obtained, excellent for human use.

Comparing the original residue with the three meal fractions obtainable by this invention, it will be observed that if the meat residue is 56% protein and the hull residue is 4% protein, a 20% protein residue is about 30% meat residue and about 70% hull residue, while a 30% protein residue is about 50% meat residue and 50% hull residue, illustrating what is being separated. A 42% protein fraction is 73% meats and 27% hulls, while an 8% protein fraction is about 8% meats and 92% hulls. A 50% protein fraction is about 88.5% meats and 11.5% hulls.

Thus to get a 42% protein meal from a 20% protein residue involves elimination of nearly two-thirds of the hulls in that fraction, and to get a 50% protein meal from a 30% protein residue means elimination of more than four-fifths of the hulls from that fraction, giving some idea of the great upgrading that is taking place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A process of preparing a high-protein feed product from the dried undecorticated oil-free solvent-extracted residue of safflower seeds, comprising the steps of
   (a) impacting the said residue so as to detach the meat particles from the hull particles and also to break up the meat particles to a greater degree than the hull particles, and
   (b) separating a finer portion of higher protein value from a coarser portion of lower protein value.

2. The process of claim 1 wherein the coarser portion is re-impacted in the same manner to achieve further breakage of meats and then is itself separated into a middlings portion and a coarse portion, the middlings portion having a significantly higher protein content than the coarse portion.

3. The process of claim 2 wherein the finer portion has a protein content of at least 40% and the coarse portion after separation of the middlings has a protein content of less than 12%.

4. A process of preparing a non-oily high-protein feed product from undecorticated safflower seeds, comprising the steps of
   (a) breaking open said safflower seeds,
   (b) solvent-extracting the oil from the broken seeds,
   (c) cooling and drying the residue to a moisture content below 15%.
   (d) impacting the residue so as to break up the meats to a greater degree than the hulls and to detach them from the hulls, and
   (e) separating a finer portion of higher protein value from a coarser portion of lower protein value.

5. The process of claim 4 wherein the coarser portion is re-impacted and then is itself separated into a middlings portion and a coarse portion, the middlings portion having a significantly higher protein content.

6. The process of claim 5 wherein the said coarse portion is again impacted and separated into two portions.

7. A process of preparing a high-portein feed product from the dried undecorticated oil-free solvent-extracted residue of safflower seeds, said residue having an average protein content of 18% to 30%, comprising the steps of
   (a) impacting the said residue so as to break up the meat particles to a greater degree than the hull particles, and to detach the meat particles from the hull particles,
   (b) classifying at least 20% of the residue as a small-size portion of at least 40% protein content from a coarser portion of lower protein value,
   (c) re-impacting said coarser portion to achieve further breakage and detachment of meat particles with minimal breakage of hull particles, and
   (d) separating the re-impacted coarser portion of meats into a middlings portion and at least 20% by weight of the residue as a coarse portion having lower than 12% protein content, the middlings portion having a significantly higher protein content than the coarse portion.

8. The process of claim 7 wherein the middlings has a protein content of 18% to 30%.

9. A process of preparing a high-protein feed product from the dried undecorticated oil-free solvent-extracted residue of a safflower seeds, said residue being about 25% to 50% meats and the remainder hulls and having an average protein content of 18% to 30%, comprising the steps of
   (a) impacting the said residue so as to fracture the less fibrous meats to a greater degree than the much more fibrous hulls, and to detach the meats from the hulls,
   (b) classifying at least 20% of the residue as a small-size portion of no more than 30% hulls and at least 70% meats and therefore of at least 40% protein content, from a coarser portion of lower protein value and containing more than 50% hulls,
   (c) re-impacting said coarser portion to achieve further breakage and detachment of meats with minimal breakage of hulls, and
   (d) separating the re-impacted coarser portion of meats into a middlings portion of about 25% to 50% meats and at least 20% by weight of the residue as a coarse portion having less than 15% meats and at least 85% hulls and hence lower than 12% protein content, the middlings portion having a significantly higher protein content than the coarse portion.

References Cited by the Examiner

UNITED STATES PATENTS

| | | | |
|---|---|---|---|
| 3,080,905 | 3/1963 | Noren | 146—221.5 |
| 3,124,461 | 3/1964 | Meinke et al. | 99—2 |

FOREIGN PATENTS 537,171   2/1957   Canada.

OTHER REFERENCES

Feed Production Handbook, pp. 230–231, Feed Production School, Inc., Kansas City, Missouri (1961).

Stringfellow et al., American Miller and Processor, pp. 18–21, April 1962.

Stringfellow et al., American Miller and Processor, pp. 22–3, May 1962.

A. LOUIS MONACELL, *Primary Examiner.*

D. DONOVAN, *Assistant Examiner.*